(12) United States Patent
Lapeira et al.

(10) Patent No.: US 7,337,958 B2
(45) Date of Patent: Mar. 4, 2008

(54) CALCULATOR DEVICE HAVING A USB CONNECTION

(75) Inventors: Sasha Lapeira, Colorado Springs, CO (US); Maria Pinsky, Colorado Springs, CO (US); Jessie Kraemer, Monument, CO (US); Cyrille de Brebisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 10/956,145

(22) Filed: Oct. 4, 2004

(65) Prior Publication Data

US 2006/0075008 A1 Apr. 6, 2006

(51) Int. Cl.
*G06K 5/00* (2006.01)

(52) U.S. Cl. ........................... 235/382; 235/441

(58) Field of Classification Search ............... 235/382, 235/441, 492, 486, 487, 475; 340/825.72, 340/995.2, 995.1
See application file for complete search history.

(56) References Cited

U.S. PATENT DOCUMENTS

| | | | | |
|---|---|---|---|---|
| 5,637,847 A | * | 6/1997 | Watanabe | 235/383 |
| 6,445,932 B1 | * | 9/2002 | Soini et al. | 455/556.1 |
| 6,910,055 B2 | * | 6/2005 | Chou | 708/142 |
| 7,042,713 B2 | * | 5/2006 | Nicolosi | 361/681 |
| 2002/0059210 A1 | * | 5/2002 | Makus et al. | 707/3 |
| 2003/0046320 A1 | * | 3/2003 | Chou | 708/142 |
| 2003/0090389 A1 | * | 5/2003 | Maeda et al. | 340/825.72 |
| 2003/0112156 A1 | * | 6/2003 | Behr et al. | 340/995.2 |
| 2004/0148131 A1 | * | 7/2004 | Azpitarte | 702/184 |
| 2004/0257342 A1 | * | 12/2004 | Chiu et al. | 345/168 |
| 2005/0188224 A1 | * | 8/2005 | Betts-LaCroix | 713/201 |
| 2006/0012560 A1 | * | 1/2006 | Wu et al. | 345/156 |

* cited by examiner

*Primary Examiner*—Thien Minh Le

(57) ABSTRACT

A method for transferring a signal between a calculator device having a USB connector and a remote device is described. The method includes: connecting the calculator device with the remote device using the USB connector; transmitting a signal from the remote device to the calculator device using the USB connector; and receiving the transmitted signal from the remote device. A calculator device having a USB connector is described. The calculator device includes a processor for executing one or more instructions, a memory connected with the processor and storing data and instructions for execution by the processor, and a USB connector connected with the processor and connectable to a remote device for transferring a signal between the calculator device and the remote device. The calculator device is responsive to a signal received over the USB connector.

28 Claims, 4 Drawing Sheets

CALCULATOR DEVICE HAVING A USB CONNECTION

FIELD OF INVENTION

The present invention relates to a calculator device having a universal serial bus (USB) connection.

BACKGROUND

A hand-held calculator is an important and useful device. Similar to a computer, the hand-held calculator has a processor, a memory, a display, and an input device; however, there are important distinguishing differences between the hand-held calculator and the computer.

The hand-held calculator is a specialized device and not a general purpose device, as is true of a computer. Because of this specialization, typically the hand-held calculator costs less, has a longer useful lifespan, and is more reliable and more portable than the computer.

Whereas a general purpose computer is capable of executing many different programs, a hand-held calculator typically executes a single program and less frequently supports execution of user-created programs. Normally, a hand-held calculator supports addition, subtraction, multiplication, and division of numbers, either integer-based or decimal-based, entered by a user and displays the results on a built-in display.

It is known in the art to use an RS-232 serial connection between a calculator device and other devices, e.g., computer systems, data logging systems, data display systems, etc.

Disadvantageously, the RS-232 serial connection supports communication with only one device at a time. Devices must be plugged and unplugged in order to change connections increasing a frustration level of a user. Further, the RS-232 serial connection is limited to a data rate of 115 Kbits/second.

SUMMARY

The present invention provides a method for transferring a signal between a calculator device having a USB connector and a remote device. The method includes connecting the calculator device with the remote device using the USB connector. A signal is transmitted from the remote device to the calculator device using the USB connector. The transmitted signal from the remote device is received at the calculator device.

A calculator device aspect includes a processor, a memory, and a USB connector. The processor executes one or more instructions. The memory is connected with the processor and stores data and instructions for execution by the processor. The USB connector is connected with the processor and connectable to a remote device for transferring a signal between the calculator device and the remote device. The calculator device is responsive to a signal received over the USB connector.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION ON THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, the mechanism of an embodiment according to the present invention provides a calculator device having a USB connection.

Figure 1:
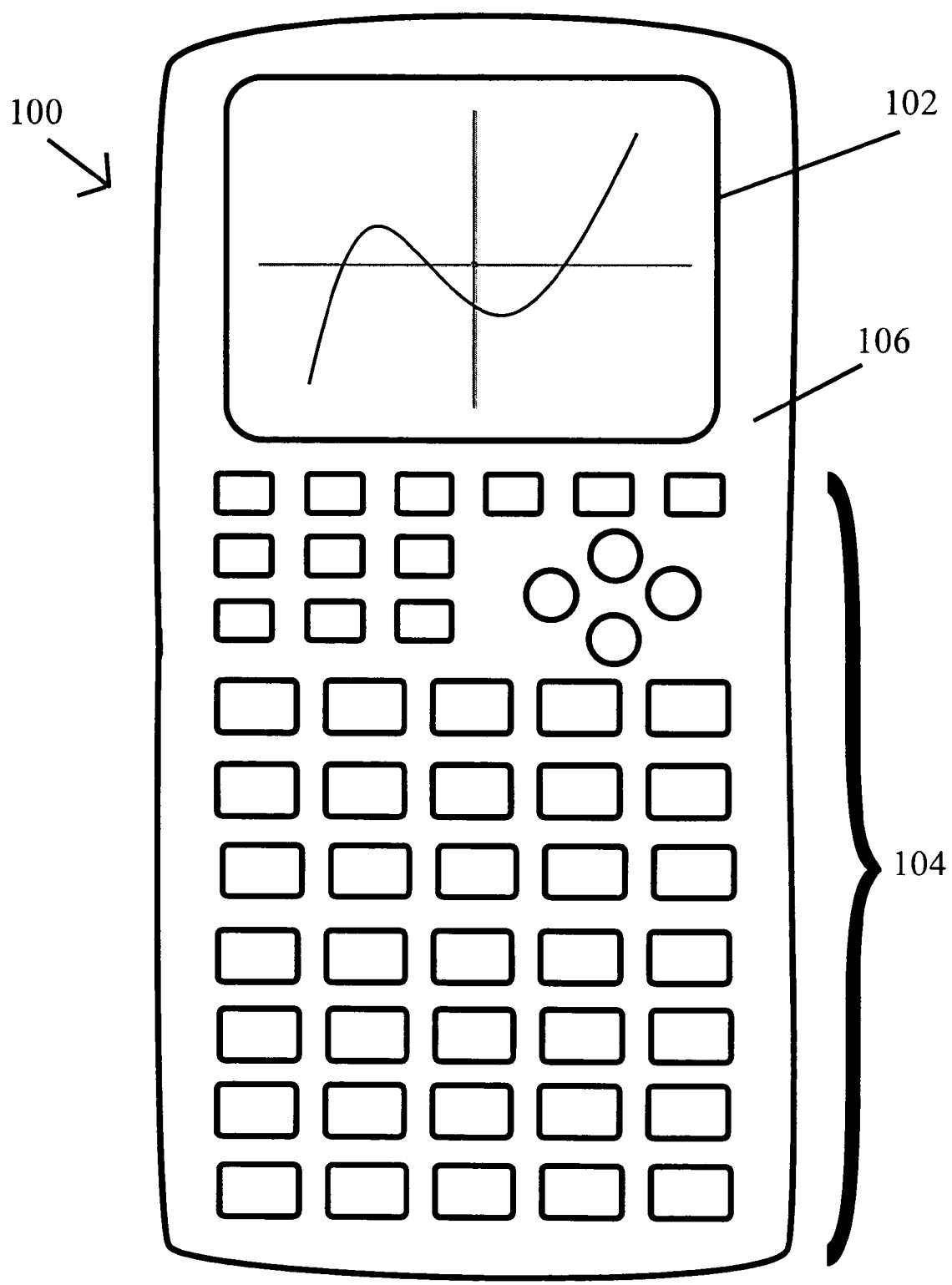
FIG. 1 is a front face view of a calculator device according to an embodiment of the present invention.

FIG. 1 is a front face view of a calculator device 100 according to an embodiment of the present invention.

Calculator device 100 includes a display 102 and a primarily key-based input area 104 set in a front face 106. Although front face 106 is depicted as a rounded rectangle, it is to be understood that the front face may be manufactured to be any of a number of different shapes. Further, although a specific number, type and configuration of input mechanisms are depicted in FIG. 1, it is to be understood that variations in the number, type, and configuration of input mechanisms may be found in different embodiments of the present invention.

Display 102 is a rectangular liquid crystal display (LCD). As shown in FIG. 1, display 102 displays a graphed function on a graph. Input area 104 includes multiple keys generally arranged in a grid. Although a grid is depicted and described, it is to be understood that the input area keys may be arranged in different configurations.

Figure 2:
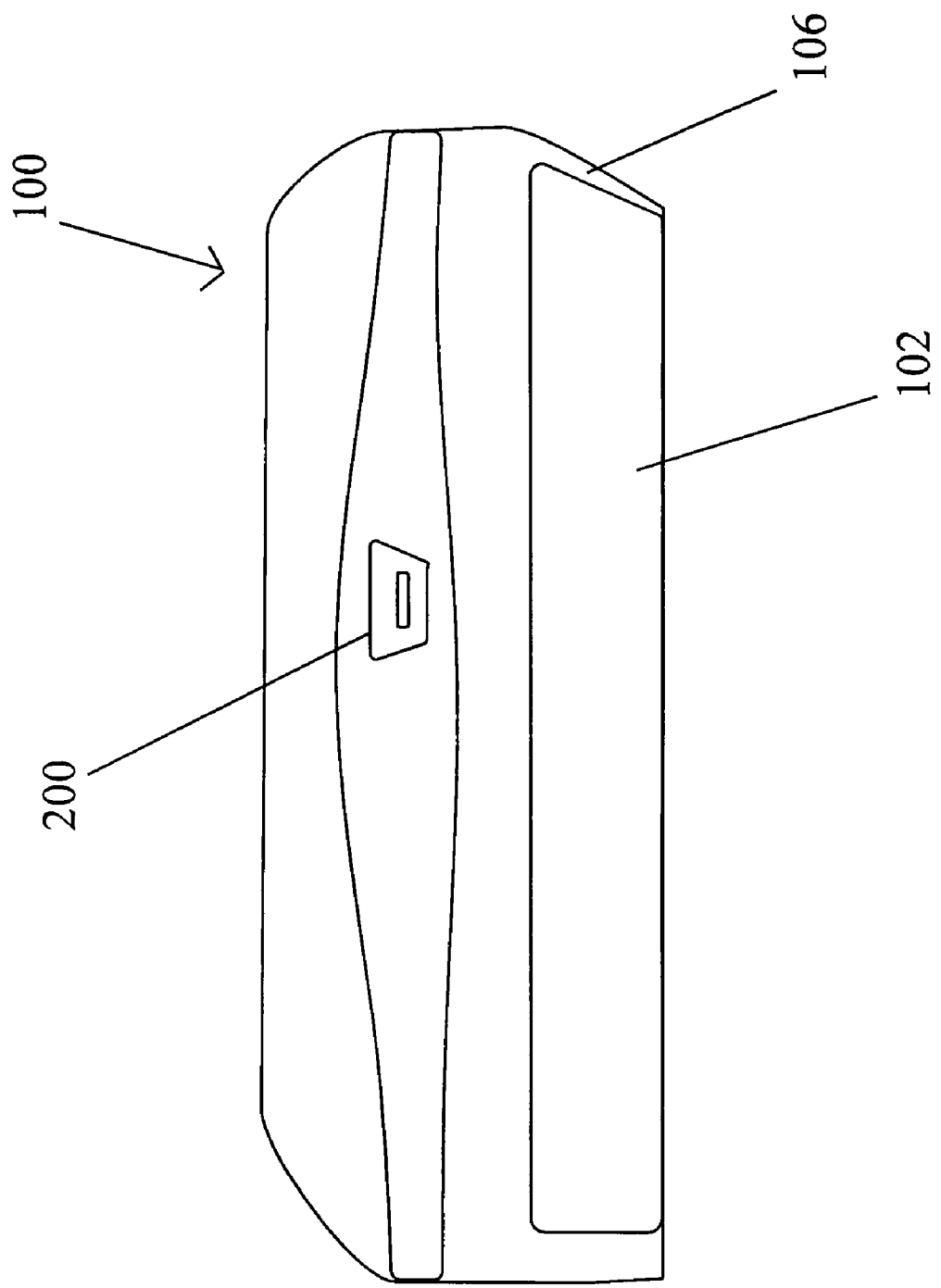
FIG. 2 is a top end view of the calculator device of FIG. 1.

FIG. 2 is a top end view of calculator device 100 of FIG. 1 depicting a USB connection 200 position toward the middle of the top end of the calculator device.

Figure 3:
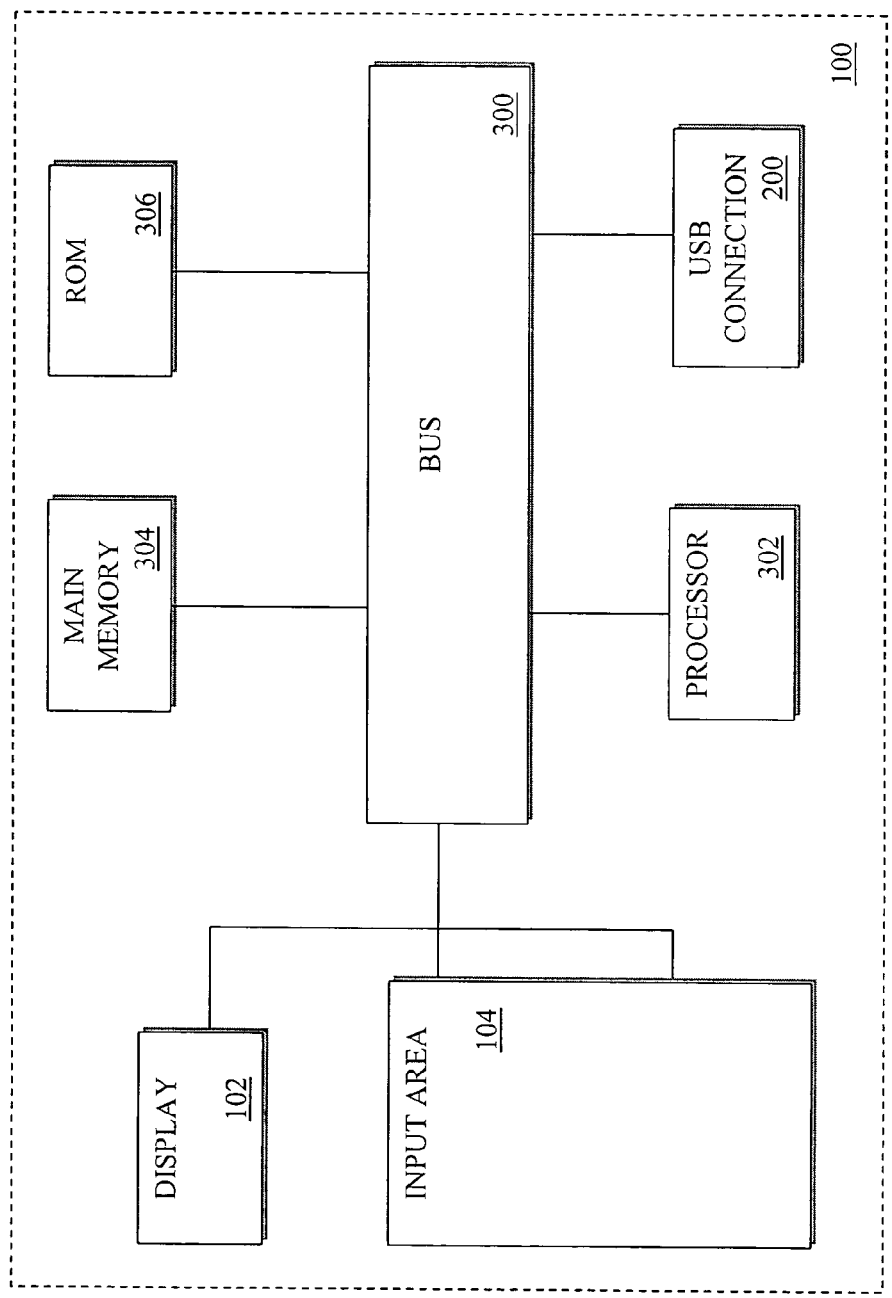
FIG. 3 is a top level block diagram of a calculator device according to an embodiment of the present invention.

FIG. 3 is a top level block diagram depicting a calculator device 100 upon which an embodiment of the invention may be implemented.

Calculator device 100 includes a bus 300 or other communication mechanism for communicating information, and a processor 302 coupled with the bus 300 for processing information. In one particular embodiment, processor 302 is a 16 bit processor. Calculator device 100 also includes a main memory 304, such as a random access memory (RAM) or other dynamic storage device, coupled to the bus 300 for storing data and expressions according to an embodiment of the present invention and instructions to be executed by processor 302. Main memory 304 also may be used for storing temporary variables or other intermediate information during execution of instructions to be executed by processor 302. Further, it is to be understood that in alternate embodiments, the components of calculator device 100 may be combined onto a single integrated circuit, e.g. processor 302 and main memory 304 may be combined on a single "system on a chip."

Calculator device 100 further includes a read only memory (ROM) 306 or other static storage device coupled to the bus 300 for storing static information and instructions for the processor 302.

Calculator device 100 may be coupled via the bus 300 to a display 102, such as the above-described LCD display, for displaying an interface to a user. An input area 104, as described above with reference to FIG. 1, is coupled to the bus 300 for communicating information, e.g. user-entered expressions and values, and command inputs to the processor 302.

Calculator device 100 further includes the USB connection 200 coupled to the bus 300 for exchanging signals with a remote device (not shown) in accordance with the USB protocol. The remote device is any device separate from calculator device 100 having a corresponding USB connection connectable with calculator device. USB connection 200 conforms to the USB specification set forth by the USB Implementers Forum, Inc. In an alternate embodiment, USB connection 200 may be a USB, a USB Hi-Speed, a USB On-The-Go, or other USB-based compliant connection.

The invention is related to the use of calculator device 100, such as the depicted calculator device of FIGS. 1-3, to connect with one or more remote devices (not shown) and transfer signals between the calculator device and the remote devices using the USB connection 200. According to one embodiment of the invention, data is stored and accessed from main memory 304 by calculator device 100 in response to processor 302 executing sequences of instructions contained in main memory 304 in response to input received via input area 104. A user interacts with the calculator device 100 via a user interface displayed (as described above) on display 102.

In an alternate embodiment, the user interacts with calculator device 100 via an interface on the remote device using USB connection 200.

Execution of the sequences of instructions contained in the main memory 304 causes the processor 302 to perform the process steps described below. In alternative embodiments, hard-wired circuitry may be used in place of or in combination with computer software instructions to implement the invention. Thus, embodiments of the invention are not limited to any specific combination of hardware circuitry and software.

Figure 4:
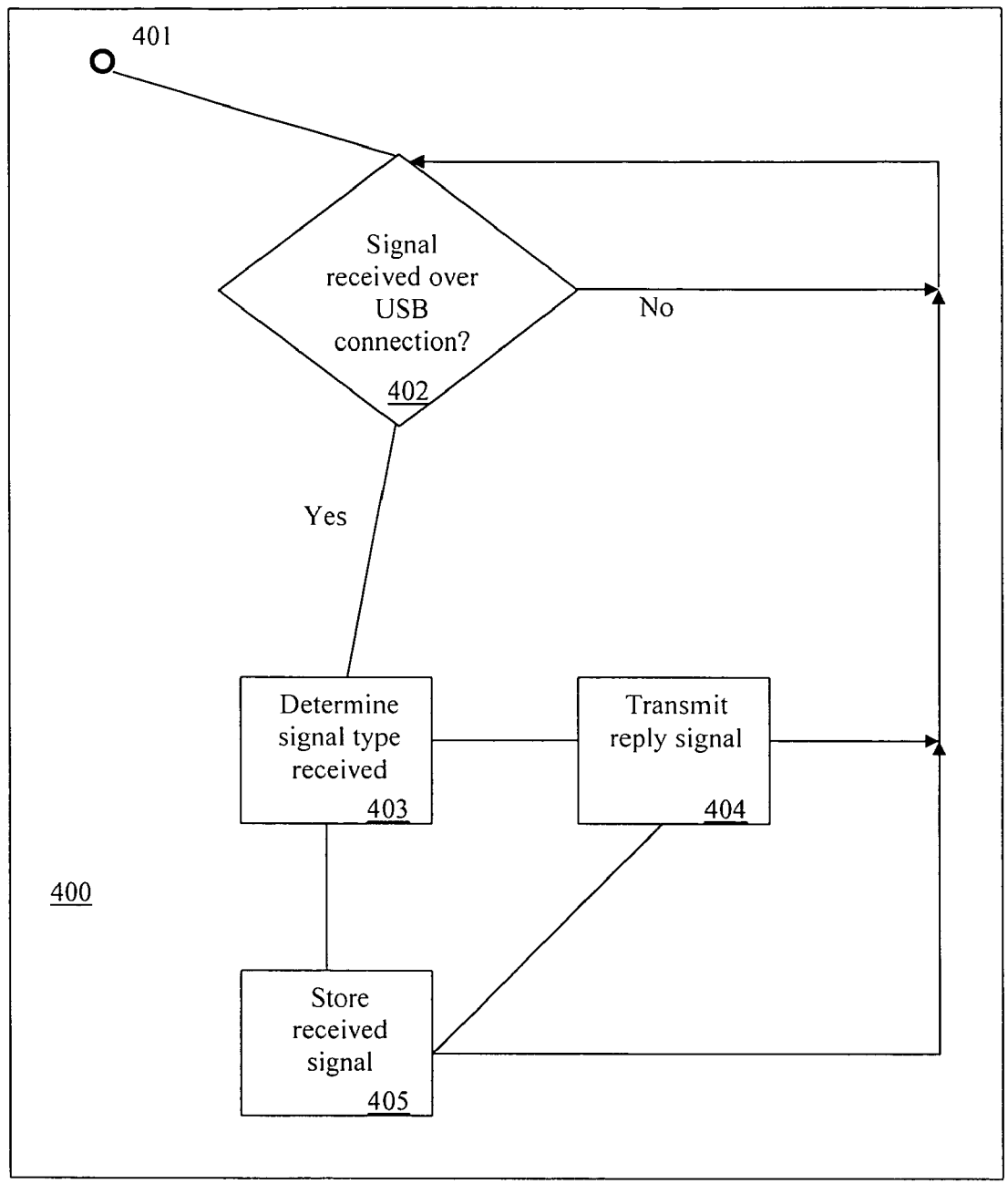
FIG. 4 is a top level flow diagram of a flow of control according to an embodiment of the present invention.

FIG. 4 is a top level flow diagram of a flow of control 400 according to an embodiment of the present invention.

Flow of control 400 is a portion of the overall flow of control of operation of calculator device 100 during execution of instructions by processor 302. Processor 302 begins execution of flow of control 400 at step 401 and proceeds to step 402 wherein processor 302, in communication with USB connection 200, determines if the USB connection receives a signal. In an alternate embodiment, USB connection 200 generates an interrupt or other signaling mechanism to processor 302 on receipt of a signal.

If USB connection 200 fails to receive a signal, processor 302 returns to step 402. If USB connection 200 receives a signal, the flow of control proceeds to step 403 wherein the processor determines the type of signal received. Depending on the determined signal type received, processor 302 either proceeds to step 404 or step 405. For example, a received signal requesting information from calculator device 100 such as a request to archive executable software, i.e., sequences of instructions, stored on the calculator device to a remote device, e.g., a computer system, causes processor 302 to proceed to step 404 to transmit the executable software for archiving via USB connection 200. Alternatively, a received signal providing executable software for installation on the calculator device 100 from remote device causes processor 302 to proceed to step 405 to store the executable software for subsequent execution by processor 302. Subsequent execution of the stored executable software may be initiated automatically, at the direction of a subsequent signal received via USB connection 200, and at the direction of user input to calculator device 100 via input area 104.

During execution of step 404, processor 302 causes USB connection 200 to transmit a reply signal responsive to the received signal. Step 404 includes the transmission of one or more signals via USB connection 200, for example, executable software, expressions, formulas, user input (either received via input area 104 or previously received via USB connection 200), etc. Depending on the received signal type, processor 302 proceeds to: (a) step 405 (described below) and stores the received signal or (b) return to step 402 to determine if USB connection 200 receives another signal. For example, a received executable software may be acknowledged via USB connection 200 and subsequently stored in memory 304.

During execution of step 405, processor 302 stores the received signal in memory 304. Step 405 includes the receipt and storage of one or more received signals from USB connection 200, for example, executable software, user input, expressions, formulas, etc. Depending on the received signal type, processor 302 proceeds to: (a) return to step 402 to determine if USB connection 200 receives another signal or (b) proceeds to step 404 to cause USB connection 200 to transmit a reply signal responsive to the received signal (described above).

In a further embodiment, during execution of step 404, the reply signal transmitted by USB connection 200 responsive to the received signal includes an equation for further evaluation and analysis by a remote device, e.g., a stand-alone computer system or workstation. That is, a user is able to transfer the equation from calculator device 100 to a remote device such as a computer system so the user may use a larger display device operatively connected with the remote device or apply a greater processing capability to the equation.

Advantageously in comparison with an RS-232 connection, a USB connection has a higher bandwidth, e.g., up to 12 Mbits/second for USB 1.0 and up to 480 Mbits/second for USB 2.0. Further, the USB connection includes the ability to provide power to an attached remote device or receive power from the remote device. Further advantageously, a USB connection supports up to 127 devices connected at a time.

Further advantageously, the USB connection interface is plug and play, i.e., devices are detected and automatically configured as soon as they are connected. Additionally, the USB connection may be hot-swapped, i.e., devices need not be powered down in order for the connection to be made.

The USB connector presents a less cumbersome connector in a simpler package and having a single manner of plugging in connectors minimizes the occurrence of damage to devices due to incorrect plugging. Further still, the USB connection supports both isochronous and asynchronous data transfers between devices.

It will be readily seen by one of ordinary skill in the art that the present invention fulfills all of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for transferring a signal between a calculator device having a USB connector and a remote device, the method comprising:
   connecting the calculator device with the remote device using the USB connector, wherein the connecting the calculator device comprises connecting a hand-held calculator comprising primarily key-based inputs;
   transmitting a signal from the remote device to the calculator device using the USB connector; and
   receiving the transmitted signal from the remote device.

2. The method of claim 1, further comprising: storing the received signal at the calculator device.

3. The method of claim 2, wherein the stored, received signal is one or more instructions for execution by the calculator device.

4. The method of claim 1, wherein the transmitted signal is one or more instructions for execution by the calculator device.

5. The method of claim 4, wherein the one or more instructions are an expression for evaluation by the calculator device.

6. The method of claim 4, wherein the one or more instructions comprise a program for execution by the calculator device.

7. The method of claim 1, wherein the transmitted signal is data from the remote device.

8. The method of claim 7, wherein the data is generated at the remote device.

9. The method of claim 1, further comprising:
   responsive to receiving the transmitted signal from the remote device, transmitting a second signal from the calculator device to the remote device using the USB connection.

10. The method of claim 9, wherein the second transmitted signal is data stored on the calculator device.

11. The method of claim 9, wherein the second transmitted signal is one or more instructions for execution by the remote device.

12. The method of claim 9, wherein the second transmitted signal is an expression to be evaluated by the remote device.

13. The method of claim 1, wherein the primarily key-based inputs of the connected calculator comprises multiple keys arranged in a grid.

14. The method of claim 13, wherein the connected calculator further comprises a display adjacent the primarily key-based inputs.

15. The method of claim 13, wherein the multiple keys arranged in a grid comprises at least a three by three grid of keys.

16. The method of claim 1, wherein the connected calculator is a specialized device arranged to perform primarily calculating functions.

17. A calculator device having a USB connector, the calculator device comprising:
   a processor for executing one or more instructions;
   a memory connected with the processor and storing data and instructions for execution by the processor; and
   a USB connector connected with the processor and connectable to a remote device for transferring a signal between the calculator device and the remote device, wherein the calculator device is responsive to a signal received over the USB connector and wherein the calculator device is a hand-held calculator comprising primarily key-based inputs.

18. The calculator device of claim 17, wherein the calculator device stores the received signal.

19. The calculator device of claim 17, wherein the received signal is one or more instructions for execution by the processor.

20. The calculator device of claim 19, wherein the one or more instructions are an expression for evaluation by the processor.

21. The calculator device of claim 19, wherein the one or more instructions comprise a program for execution by the processor.

22. The calculator device of claim 17, wherein responsive to the received signal, the processor causes the USB connector to transmit a second signal.

23. The calculator device of claim 22, wherein the second signal is data stored on the calculator device.

24. The calculator device of claim 22, wherein the second signal is one or more instructions for execution by the calculator device.

25. The calculator device of claim 17, wherein the primarily key-based inputs of the calculator device comprises multiple keys arranged in a grid.

26. The calculator device of claim 25, wherein the calculator device further comprises a display adjacent the primarily key-based inputs.

27. The calculator device of claim 25, wherein the multiple keys arranged in a grid comprises at least a three by three grid of keys.

28. The calculator device of claim 17, wherein the calculator device is a specialized device arranged to perform primarily calculating functions.

* * * * *